C. F. AND A. I. JOHNSON.
TIRE CHAIN TIGHTENER AND LOCK.
APPLICATION FILED AUG. 6, 1921.
1,407,753. Patented Feb. 28, 1922.
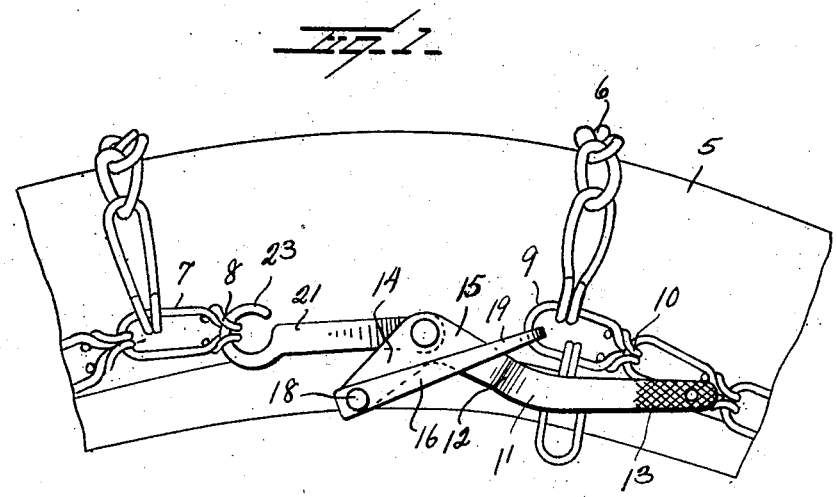
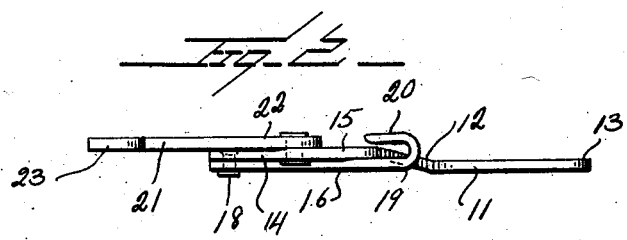
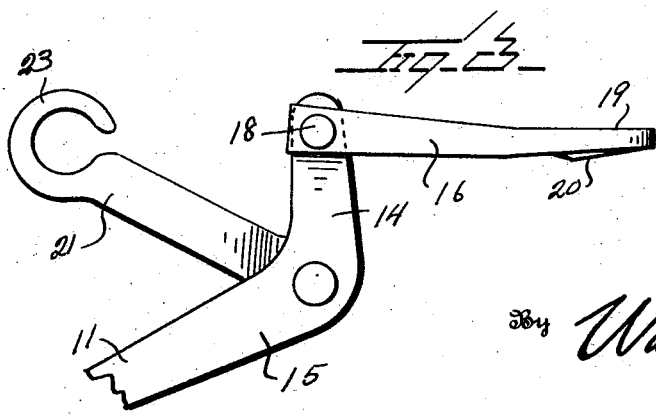
Inventors
C. F. Johnson and
A. I. Johnson
By Watson E. Coleman
Attorney

UNITED STATES PATENT OFFICE.

CARL F. JOHNSON AND ANDERS IVER JOHNSON, OF LABOLT, SOUTH DAKOTA.

TIRE-CHAIN TIGHTENER AND LOCK.

1,407,753. Specification of Letters Patent. Patented Feb. 28, 1922.

Application filed August 6, 1921. Serial No. 490,319.

*To all whom it may concern:*

Be it known that we, CARL F. JOHNSON and ANDERS IVER JOHNSON, citizens of the United States, residing at Labolt, in the county of Grant and State of South Dakota, have invented certain new and useful Improvements in Tire-Chain Tighteners and Locks, of which the following is a specification, reference being had to the accompanying drawings.

This invention relates to chain tighteners and more particularly to a combined chain tightener and lock for tire chains.

An object of the invention is to provide a device of this character which may not only be used for drawing the ends of the chain toward each other, but may also be used to connect the ends and hold the chain in the proper position on a tire.

It is another object of the invention to provide a tightener of this character wherein a pair of connecting hooks are provided and pivoted to a lever member in offset relation to each other to draw the ends of the chain toward each other.

It is also an object of the invention to provide a device of this character wherein the hook members are pivoted to a handle member substantially in alignment with each other, and wherein said handle member is adapted to position said pivotal connection of the hook members on each side of the center of gravity of the portion of the handle to which the hook members are connected.

It is still a further object of the invention to provide a device of this character embodying a lever having a hook member pivoted on one side thereof, a hook member pivoted on the opposite side thereof, the bills of said hooks being disposed at right angles to each other so to render the device as compact as possible when in use.

With these and other objects in view, the invention consists in the improved construction and arrangement of parts to be hereinafter more particularly described, fully claimed and illustrated in the accompanying drawings, in which:—

Figure 1 is a side elevation of a chain tightener and lock constructed in accordance with our invention.

Figure 2 is a top plan view of the device in its locked position, and

Figure 3 is an enlarged fragmentary view of the position of the parts when being applied to the chain.

Referring to the drawings, 5 designates a tire to which a tire chain 6 is applied. The end link 7 of the chain is provided with loops 8 which extend substantially at right angles to the link 7 and are of conventional construction. The end link 9 of the opposite end of the chain has its loop portions 10 extending in the same direction as the loop portions 8.

The parts of the chain above described are of well known construction and in order to permit a chain of this type to be readily applied and secured to a tire, there is provided a novel combined tightener and lock comprising a lever 11, said lever being offset at its intermediate portion 12 so as to permit the end portion 13 of the lever to clear the links adjacent the link 9 when the device is being locked, and also to permit the operator to manipulate the device without interference from the chain or tire. The end portion 13 of the lever is also extended in angular relation to the opposite end portion 14.

By offsetting the intermediate portion of the lever and inclining the end portion 13, the portion 15 of the lever, namely that portion of the device which extends from the offset portion 12 to the junction of the right angular portion of the lever, a V-shaped portion is provided for use in locking the ends of the chain, the function of which will be hereinafter described.

A connecting hook member 16 is provided, said member having an opening through which a pivot pin 18 is passed for pivotally connecting said hook member to the extremity of the end portion 14 of the lever. It will be noted that the hook member 16 tapers longitudinally from one end to the opposite end 19 of said member. The end portion 19 is bent or extended to provide a hook 20, the bill of the hook 20 being disposed substantially obliquely of the shank or hook member 16. The hook 20 is also disposed at right angles to the opening 17, so that the bill of the hook extends substantially from one edge of the hook member to the opposite edge, and is likewise offset with respect to the base of the bill.

In connection with the hook member 16, a second connecting hook member 21 is provided, said hook member being pivoted at its end 22 to the junction of the portions 14 and 15 of the lever 11. The opposite end of the member 21 is substantially bent or coiled to provide a hook 23, said hook being disposed substantially in the plane of the side of the member 21. The bill of the hook 23 is extended toward the hook member 21 and terminates substantially in spaced relation to the base of the hook to afford an entrance to the hook 23. It will be also noted that the hook 23 is disposed at right angles to the hook 20, while the hook member 21 is pivoted to the opposite side of the lever 11 to that occupied by the hook member 16.

By this novel arrangement, the fact that the loops 8 of the link 7 project outwardly and substantially at right angles to the link 7, and that the link 9 is disposed substantially in the plane of the link 7, it is possible to properly connect the links 7 and 9 without causing bulging of parts from the side of the tire which are apt to come in contact with stones or like objects in the road. When the above operation takes place, the pivotal connections of the hook members 16 and 21 are disposed substantially in vertical alignment. In other words, the end portion 14 is disposed vertically, while the hook members are disposed in offset relation. To lock the device, the end portion 13 of the lever is swung toward the hook 20 of the member 16 so as to move the pivotal connections of the hook members from their vertical positions, thereby swinging the pivotal connection of the hook member 16 below the pivotal connection of the hook member 21, so as to dispose the end portion 14 of the lever beyond the center of gravity. In view of the fact that the bill of the hook 20 is disposed substantially obliquely of the shank of the hook member 16, a socket is formed into which the intermediate portion of the lever is adapted to extend. By this means, the bill of the hook 20 is disposed substantially in alignment with the pivoted end of the hook member 21 so that the device is rendered compact and there are no projections beyond the tire chain. Furthermore, by disposing the end portion of the lever 14 to one side of the center of gravity, any pull on the hook member 23 will serve to move the end portion 14 of the lever substantially to a vertical position. This movement is rather difficult and as a matter of fact cannot be accomplished accidentally so that unlocking or disengagement of the hook members from the chain is prevented unless accomplished manually.

From the foregoing it will be readily seen that this invention provides a novel combined tire chain tightener and lock capable of being applied to a conventional make of chain to lock the chain without the use of separate locking means. An important feature of this device is that after the operating lever has been moved to its locked position, as disclosed in Figure 1, the hook 20 substantially serves as a stop to limit continued movement of the lever in the same direction, so that the only way that the chain can be released is to move the lever in the opposite direction. All of these features are possessed by a device that is simple in construction and practical in use.

What is claimed is:—

1. A combined chain tightener and lock embodying a lever, a member pivoted to one end of the lever, said member having a hook on one end, the hook being disposed out of the path of movement of said lever, a second member pivoted to said end of the lever in spaced relation to the first mentioned member, a hook formed on one end of the second mentioned member, the bill of each of said hook members being disposed at right angles to each other, the hook of the second mentioned member being adapted to receive a portion of the lever to limit movement of said lever in one direction.

2. A tire chain tightener and lock comprising a lever having one end disposed substantially at right angles to the main portion of the lever, an arm pivoted at one end to the lever adjacent said end of the lever, said arm having a hook formed on one end, the hook being disposed in the plane of the sides of the arm and parallel to the sides of the lever to permit unobstructed movement of the lever over the hook, a second arm pivoted to said end of the lever, the second mentioned arm having a hook formed on one end, the hook projecting from one side of the arm substantially at right angles to the side of the lever, the distance between the bill of the last mentioned hook and the adjacent side of the arm of said hook being sufficient to permit the entrance of the lever into said hook whereby said second mentioned hook provides a stop to limit movement of the lever in one direction.

In testimony whereof we hereunto affix our signatures.

CARL F. JOHNSON.
A. IVER JOHNSON.